US010400776B2

(12) United States Patent
Grassens et al.

(10) Patent No.: US 10,400,776 B2
(45) Date of Patent: *Sep. 3, 2019

(54) LOAD SHARING CONTROL FOR COMPRESSORS IN SERIES

(71) Applicant: Woodward, Inc., Fort Collins, CO (US)

(72) Inventors: Walter Grassens, Loveland, CO (US); Brian Eldredge, Timnath, CO (US)

(73) Assignee: Woodward, Inc., Fort Collins, CO (US)

( * ) Notice: Subject to any disclaimer, the term of this patent is extended or adjusted under 35 U.S.C. 154(b) by 135 days.

This patent is subject to a terminal disclaimer.

(21) Appl. No.: 15/428,998

(22) Filed: Feb. 9, 2017

(65) Prior Publication Data

US 2017/0152856 A1    Jun. 1, 2017

Related U.S. Application Data

(63) Continuation of application No. 14/089,471, filed on Nov. 25, 2013, now Pat. No. 9,695,834.

(51) Int. Cl.
*F04D 27/00* (2006.01)
*F04D 27/02* (2006.01)
(Continued)

(52) U.S. Cl.
CPC ........... *F04D 27/005* (2013.01); *F04D 25/16* (2013.01); *F04D 27/002* (2013.01);
(Continued)

(58) Field of Classification Search
CPC ... A47C 31/008; A47C 27/081; A47C 27/082; A47C 27/083; G05B 23/0267
(Continued)

(56) References Cited

U.S. PATENT DOCUMENTS 4,940,391 A * 7/1990 Elms .................... H02H 7/0854
                                                417/12
5,242,263 A    9/1993 Mondoloni
(Continued)

FOREIGN PATENT DOCUMENTS

CN    1405456 A    3/2003
CN    1671967 A    9/2005
(Continued)

OTHER PUBLICATIONS

International Search Report and Written Opinion of the International Searching Authority issued in International Application No. PCT/US2014/066306 dated Feb. 26, 2015; 9 pages.
(Continued)

*Primary Examiner* — Ziaul Karim
(74) *Attorney, Agent, or Firm* — Fish & Richardson P.C.

(57) ABSTRACT

In some aspects, a compressor system includes a compressor train including two or more compressors connected in series and a control mechanism. The control mechanism is controlled by a performance controller. The performance controller is operable to identify a process variable of the performance controller; receive, on a recurrent basis from a load sharing controller, a setpoint for the process variable of the performance controller; and control the control mechanism based on the setpoint and the process variable of the performance controller. The setpoint is determined dynamically during operation of the two or more compressors by the load sharing controller based on a load sharing parameter associated with the two or more compressors.

20 Claims, 4 Drawing Sheets

(51) Int. Cl.
*G05B 15/02* (2006.01)
*F04D 25/16* (2006.01)
*F04D 29/44* (2006.01)
*F04D 29/54* (2006.01)

(52) U.S. Cl.
CPC ....... *F04D 27/004* (2013.01); *F04D 27/0246* (2013.01); *F04D 27/0253* (2013.01); *F04D 27/0261* (2013.01); *F04D 27/0269* (2013.01); *F04D 29/444* (2013.01); *F04D 29/542* (2013.01); *G05B 15/02* (2013.01)

(58) Field of Classification Search
USPC .......................................................... 700/79
See application file for complete search history.

(56) References Cited

U.S. PATENT DOCUMENTS

| | | | | |
|---|---|---|---|---|
| 5,306,116 | A | * | 4/1994 | Gunn ....................... F04D 27/02 415/17 |
| 5,343,384 | A | | 8/1994 | Fisher et al. |
| 5,347,467 | A | * | 9/1994 | Staroselsky ......... F04D 27/0269 415/1 |
| 5,743,714 | A | * | 4/1998 | Drob ....................... F04D 27/00 415/1 |
| 5,743,715 | A | * | 4/1998 | Staroselsky ......... F04D 27/0269 415/1 |
| 6,602,057 | B2 | | 8/2003 | Saxena et al. |
| 6,755,620 | B2 | | 6/2004 | Nakamura et al. |
| 7,676,283 | B2 | | 3/2010 | Liepold et al. |
| 2003/0063981 | A1 | * | 4/2003 | Saxena ................... F01D 15/08 417/286 |
| 2008/0131258 | A1 | | 6/2008 | Liepold et al. |
| 2009/0232663 | A1 | | 9/2009 | Mirsky |
| 2009/0317260 | A1 | | 12/2009 | Mirsky et al. |
| 2015/0293505 | A1 | * | 10/2015 | Acosta Gonzalez ... F04D 27/00 700/29 |

FOREIGN PATENT DOCUMENTS

| | | |
|---|---|---|
| CN | 1780987 A | 5/2006 |
| EP | 0769624 | 12/2001 |
| JP | 2000-120583 A | 4/2000 |
| RU | 128917 | 6/2013 |

OTHER PUBLICATIONS

PCT International Preliminary Report on Patentability, PCT/US2014/066306, dated Jun. 9, 2016, 7 pages.

The State Intellectual Property Office of People's Republic of China, The First Office Action issued in Chinese Application No. 201480073921.9 dated Apr. 26, 2017, 10 pages.

Notice of Allowance issued in Chinese Application No. 201480073921.9 dated Aug. 28, 2017; 7 pages.

* cited by examiner

LOAD SHARING CONTROL FOR COMPRESSORS IN SERIES

CROSS-REFERENCE TO RELATED APPLICATION(S)

This application is a Continuation of and claims the benefit of priority to U.S. patent application Ser. No. 14/089,471, filed on Nov. 25, 2013, now issued as U.S. Pat. No. 9,695,834 on Jul. 4, 2017, the contents of which are hereby incorporated by reference.

BACKGROUND

This specification relates to controlling compressor load sharing.

A compressor is a machine which increases the pressure of a compressible fluid, e.g., a gas, through the use of mechanical energy, for instance. Compressors are used in industrial processes in various applications, for example, in pipeline, petrochemical, and other applications. Multiple compressors can be assembled together to supply compressed fluid and load can be shared among the multiple compressors. Effective load-sharing algorithms are desirable to distribute and balance the load among the multiple compressors such that the multiple compressors work cooperatively to optimize the overall performance of a compressor system.

SUMMARY

In some aspects, a compressor system includes a compressor train including two or more compressors connected in series and a control mechanism. The control mechanism is controlled by a performance controller. The performance controller is operable to identify a process variable of the performance controller; receive, on a recurrent basis from a load sharing controller, a setpoint for the process variable of the performance controller; and control the control mechanism based on the setpoint and the process variable of the performance controller. The setpoint is determined dynamically during operation of the two or more compressors by the load sharing controller based on a load sharing parameter associated with the two or more compressors.

The details of one or more implementations are set forth in the accompanying drawings and the description below. Other features, objects, and advantages will be apparent from the description and drawings, and from the claims.

DETAILED DESCRIPTION

Figure 1:
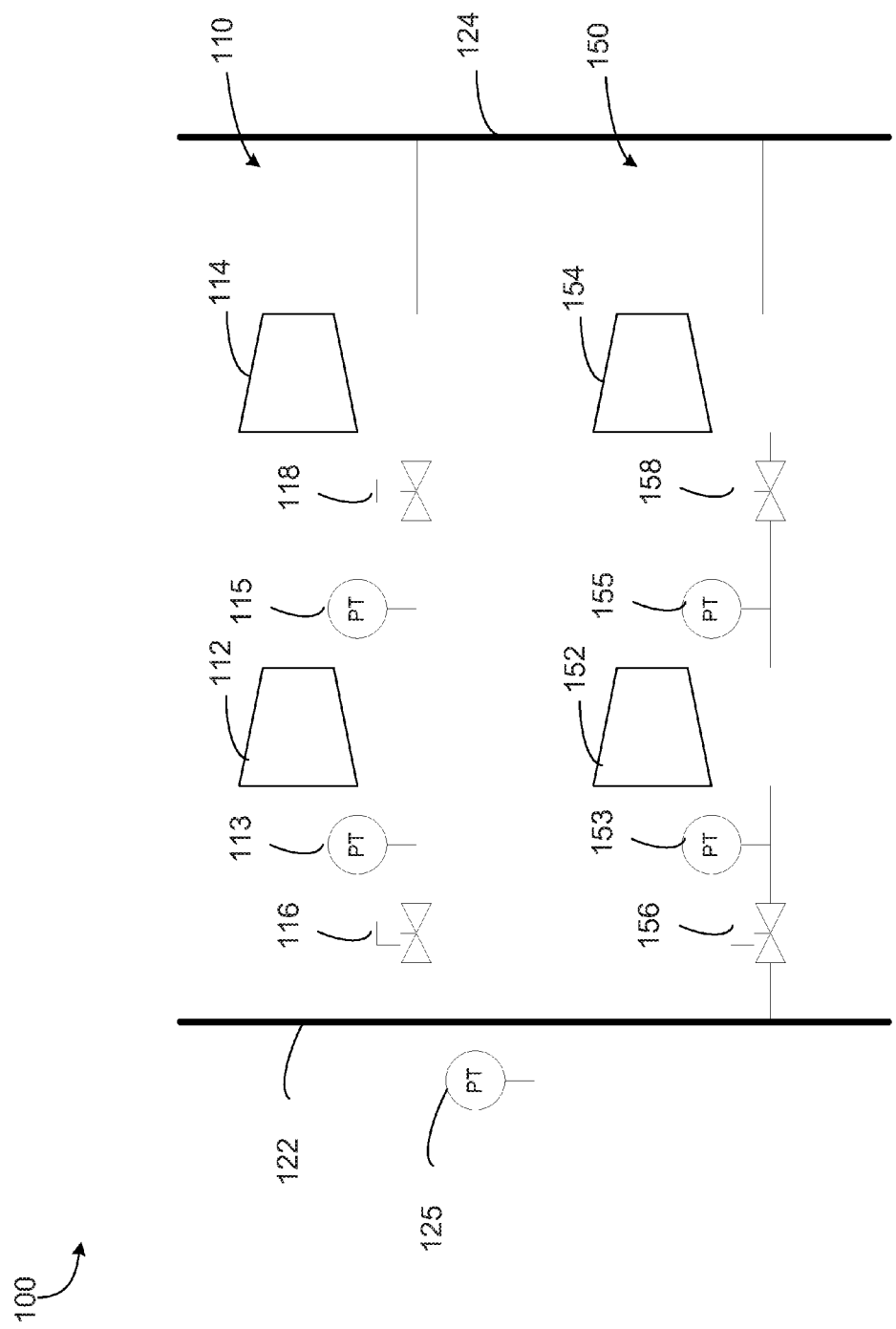
FIGS. 1 and 2 are schematic diagrams of example compressor systems.

Some systems (e.g., gas and steam turbines, petrochemical systems, pipeline systems, industrial systems, etc.) include multiple compressors that are, for example, connected in parallel, in series, or in a hybrid manner. Load sharing among the multiple compressors is important for optimizing the overall system performance. In addition, load sharing algorithms are desirable to maintain stable operations and effective utilization of the multiple compressors. In some instances, load sharing can be divided into parallel load sharing and in other instances the load sharing can be serial load sharing (SLS). These load sharing systems and techniques may be used with parallel compressors and serial compressors, respectively. In particular, parallel load sharing includes a control objective in which load is divided between two or more parallel compressors or compressor trains which are connected to common suction and discharge pressure headers. On the other hand, serial load sharing includes a control objective in which load is divided between two or more serial compressors which are arranged such that the discharge of the first compressor is connected to the suction of the second compressor, and so on for subsequent compressors.

Conventional load sharing algorithms exist, for example, for parallel load sharing to calculate a load sharing bias for each compressor train's primary controller. But issues arise when the conventional algorithms are used for controlling compressor parameters with serial compressors and control mechanisms (e.g., process control valves) that share a common flow. In some implementations, the conventional algorithms may yield an unstable control with an inverse control reaction between valves in series. For example, they may cause one valve to fully open while the other valve becomes fully closed in response. Eventually, the conventional algorithms can result in loss of control and driving the control valves to their limits.

The example techniques described in this disclosure can help resolve the above mentioned problems. In particular, a performance controller can be used to control a control mechanism. In some instances, multiple serial controls mechanisms can each have a respective performance controller. The control parameter of the performance controllers can be selected such that the control outputs of the performance controllers result in consistent, not inverted, control reactions of the multiple serial control mechanism. As an example, pressure can be used as the control parameters of the performance controller. The performance controller, operating with the pressure, can control a secondary control mechanism to respond favorably to the movements of a primary control mechanism and therefore achieve a stable control of the compressor system.

In addition, the example techniques include a cascaded controller that drives a setpoint of the performance controller. The cascaded controller can be a load sharing controller that operates with load sharing parameters (e.g., a distance from surge) while the performance controller operates with process variables (e.g., pressure). The control output of the cascaded load sharing controller can be converted to a process set point for the performance controller. The performance controller controls the process variable according to the process set point and sends control output to the control mechanisms. The combination of the cascaded controller controlling the load sharing parameter and the performance controller controlling a pressure that works with, not against, the primary controller achieves serial load sharing goals and allows for smooth and stable control.

The example techniques described herein can be effectively applied, for example, to serial compressors and can achieve various advantages. For instance, the example techniques can help establish serial load sharing not only for a signal compressor train including multiple serial compressors, but also for multiple serial compressor trains that are further subject to parallel load sharing constraints. In some instances, unlike conventional load sharing algorithms that may be efficient for plant operation assuming no unit is near surge conditions, the example techniques use appropriate load sharing parameter (e.g., distances from surge, pressure ratios, etc.) and can prevent the anti-surge valve from opening prematurely, even if the compressors are operating close to surge conditions. Moreover, the difference of pressure ratios or distance from surge between compressors is not linear for varying operating conditions; the techniques described herein are not drastically affected by this non-linearity and can provide robust and reliable load sharing control for a variety of applications. In some aspects, the serial load sharing control techniques described here can provide improved efficiency, reliability, control stability, or a combination of these and other benefits for the entire compressor system. Additional or different advantages may be obtained in some applications.

FIG. 1 is a schematic diagram of an example compressor system 100. The example compressor system 100 includes two compressor trains 110, 150 in parallel and each of the two trains 110, 150 includes two compressors connected in series. The two compressor trains 110 and 150 are connected to a common suction line 122 and a common discharge line 124. The first compressor train 110 includes compressors 112 and 114, such that the discharge of the first compressor 112 is connected to the suction of the second compressor 114. In some instances, the first compressor 112 may be referred to as an upstream compressor while the second compressor 114 may be referred to as downstream compressor. The second compressor train 150 includes two serial compressors 152 and 154 connected in a similar manner to the two compressors 112 and 114 in the first compressor train 110. In some implementations, a compressor system can include more than two compressor trains connected in parallel. For example, a compressor system can include five parallel compressor trains that divide load from a common suction header. Each compressor train can include one or more compressors. For instance, one of the multiple compressor trains can include three serial compressors that share a common flow while another train may include only one compressor. A compressor system can include additional or different compressors that are configured in parallel, in series, or in another manner.

A compressor system can include additional measurement equipment, control mechanisms or other components. The measurement equipment can include, for example, one or more of a flow element that indicates a property (e.g., quantity, velocity, rate, etc.) of flow, a pressure transducer, a temperature transducer, or another kind of sensor or meter. The control mechanisms can include, but are not limited to, a control valve (e.g., an inlet or suction valve, a recycle valve, etc.), a speed governor, an inlet guide vane, or any other type of control device. The measurement equipment and control mechanism can be coupled to one or more of a common suction line and discharge line (e.g., suction line 122 and discharge line 124), a compressor train (e.g., compress train 110, 150), or any other components of the compressor system 100. The measurement equipment and control mechanism can be placed and configured in various manners as needed.

In the example shown in FIG. 1, pressure transducer (PT) 125 is coupled to the suction line 122 of compressor system 100 and is capable of measuring the suction header pressure. In some instances, PT 125 may be referred to as a suction header pressure transducer. The first compressor train 110 includes two control valves 116, 118 and two PTs 113, 115. The first compressor train 110 can include another type of control mechanism or measurement equipment. In some instances, PT 113 is operable to measure the suction pressure of compressor 112 while PT 115 is operable to measure the discharge pressure of compressor 112. In some implementations, since PT 115 is upstream of control valve 118 and compressor 114, the pressure measured by PT 115 can be used as the upstream pressure of control valve 118 and compressor 114. The second compressor train 150, including two control valves 156, 158 and two PTs 153, 155 is configured in a similar manner to the first compressor train 110.

In some implementations, each control valve can be controlled by a performance controller. A performance controller is a controller that manipulates a compressor's throttle valve, inlet guide vanes, speed governor, or other control mechanisms, for controlling a process parameter (e.g., plant pressure). In some instances, the performance controller can also share its process with multiple trains in parallel. In the illustrated example in FIG. 1, control valve 116 is a primary control valve controlled by a primary controller. A primary controller controls a primary plant parameter, for example, suction header pressure or discharge header pressure. In some implementations, a primary controller may also be subject to parallel load sharing between trains. In the example shown in FIG. 1, the performance controller of control valve 116 controls suction header pressure measured by PT 125 and is subject to parallel load sharing between compressor trains 110 and 150.

Control valve 118 is a secondary control valve controlled by a secondary controller. The secondary controller is a performance controller that carries out the serial load sharing function by affecting its own performance output. For example, the secondary controller can control pressure and send its performance output to control valve 118. In response, control valve 118 can fully or partially open or close. In some implementations, the secondary controller can include a performance controller and a serial load sharing controller. The serial load sharing controller can be cascaded to the performance controller, meaning that it can be used to drive the setpoint of the performance controller. The serial load sharing controller and the performance controller work together as the secondary controller to deliver the serial load sharing control for the multiple compressors in series. Example functions and interactions of the cascaded controller and the performance controller are described with respect to FIG. 3 in more detail.

Figure 2:
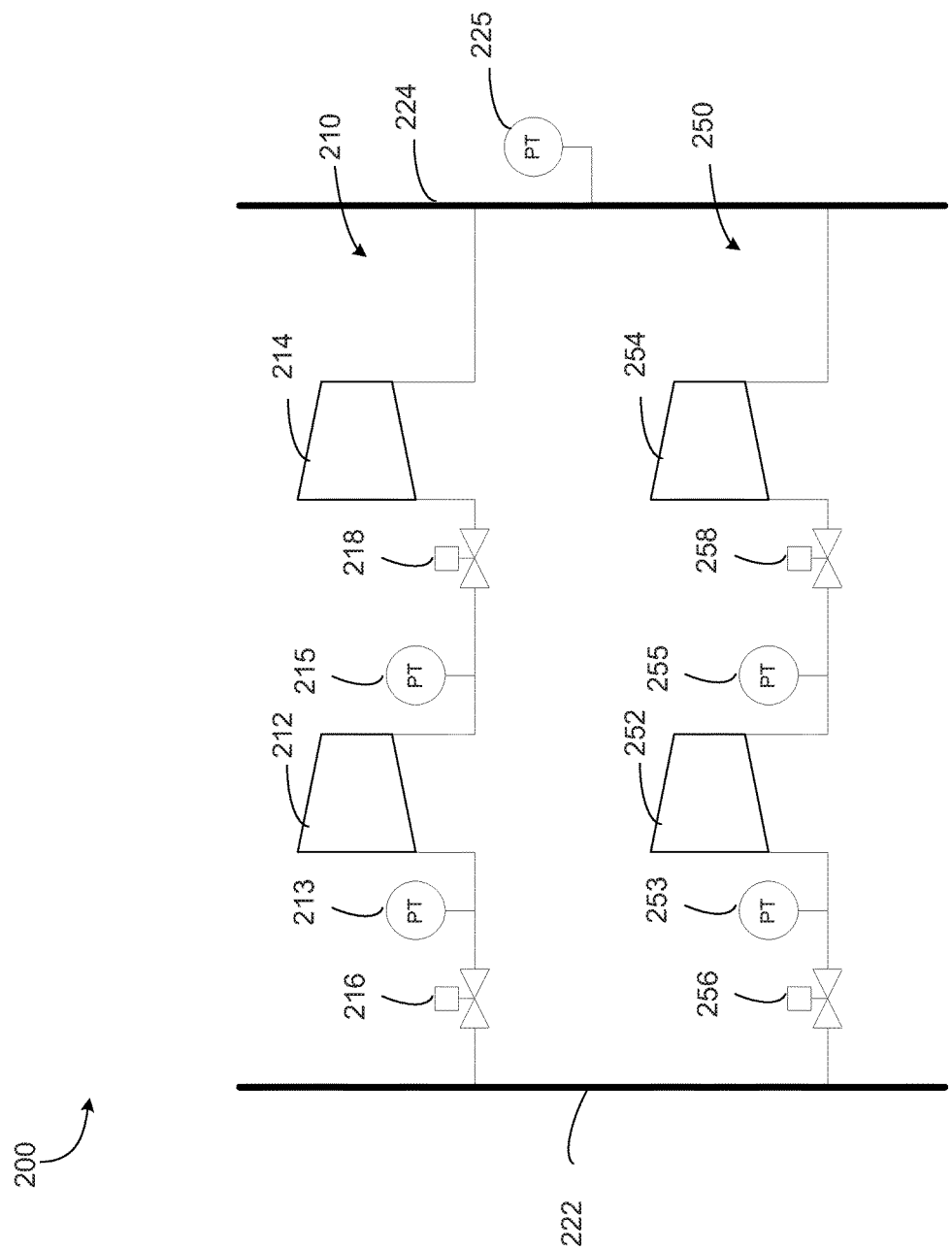

FIG. 2 is a schematic diagram of another example compressor system 200. Compressor system 200 can have the same or a different configuration than compressor system 100. For illustration, the example compressor system 200 resembles the example compressor system 100 in FIG. 1 except that FIG. 2 is directed towards an example discharge pressure control case whereas FIG. 1 is directed towards an example suction pressure control case. In particular, compressor system 200 includes two compressor trains 210, 250 in parallel and each of two trains 210, 250 including two compressors connect in series. The two compressor trains 210 and 250 share a common suction line 222 and a common discharge line 224. PT 225 is coupled to the discharge line 224 and is operable to measure the discharge header pressure. The first compressor train 210 includes two serial compressors 212 and 214, two control valves 216 and 218, and two PTs 213 and 215. The second compressor train 250 includes two serial compressors 252 and 254, two control valves 256 and 258, and two PTs 253 and 255. In contrast to FIG. 1, control valves 218 and 258 (downstream of control valves 216 and 256, respectively) are primary control mechanisms. Primary control valves 218 and 258 are controlled by primary controllers that operate with a primary plant parameter, for example, discharge header pressure as measured by PT 225. Control valves 216 and 256 are secondary control valves controlled by secondary controllers that are responsible for serial load sharing within each compressor train. Similarly, the secondary controllers can include a performance controller and a cascaded serial load sharing controller.

In some implementations, pressure can be determined and used as the process parameter for the performance controller. Other parameters such as motor current, distance from surge, pressure ratio, a bias calculated based on compressor work (e.g., calculated by an anti-surge logic), etc. may be used by serial load sharing control algorithms. In some aspects, for stability control, the primary and secondary controller need to control process parameters that will not result in inverted reactions between the primary and secondary control mechanism. For instance, if the primary controller is controlling a pressure upstream of the primary control mechanism, such as a throttle valve, then the secondary controller may need to control pressure upstream of the control mechanism associated with the secondary control mechanism (e.g., as depicted in FIG. 1). Similarly, for downstream pressure control, the secondary controller may need to control pressure downstream of its control mechanism if the primary controller is controlling pressure downstream of the primary control mechanism (e.g., as depicted in FIG. 2). Such an arrangement can make the valves work consistently (i.e., they will move in the same direction when responding to a change in the primary control's process value or setpoint).

In some instances, simple pressure control for the secondary controller does not accomplish a load sharing objective, such as balancing compressors by maintaining both compressors at an approximately equal load or distance from surge. To achieve serial load sharing objects, a load sharing parameter can be determined for a load sharing controller. The load sharing controller can be cascaded to the performance controller associated with the control mechanism, to drive the setpoint of the performance controller. The load sharing parameter can include, but is not limited to, an operating point parameter (e.g., a distance from surge), a pressure ratio, (polytropic) head, external parameters, or other parameters. In some aspects, the performance controller included in the secondary controller can provide stable operation in response to setpoint and process changes, while the cascaded controller included in the secondary controller can ensure that both compressors operate, for example, at an approximately equal distance from surge.

Figure 3:
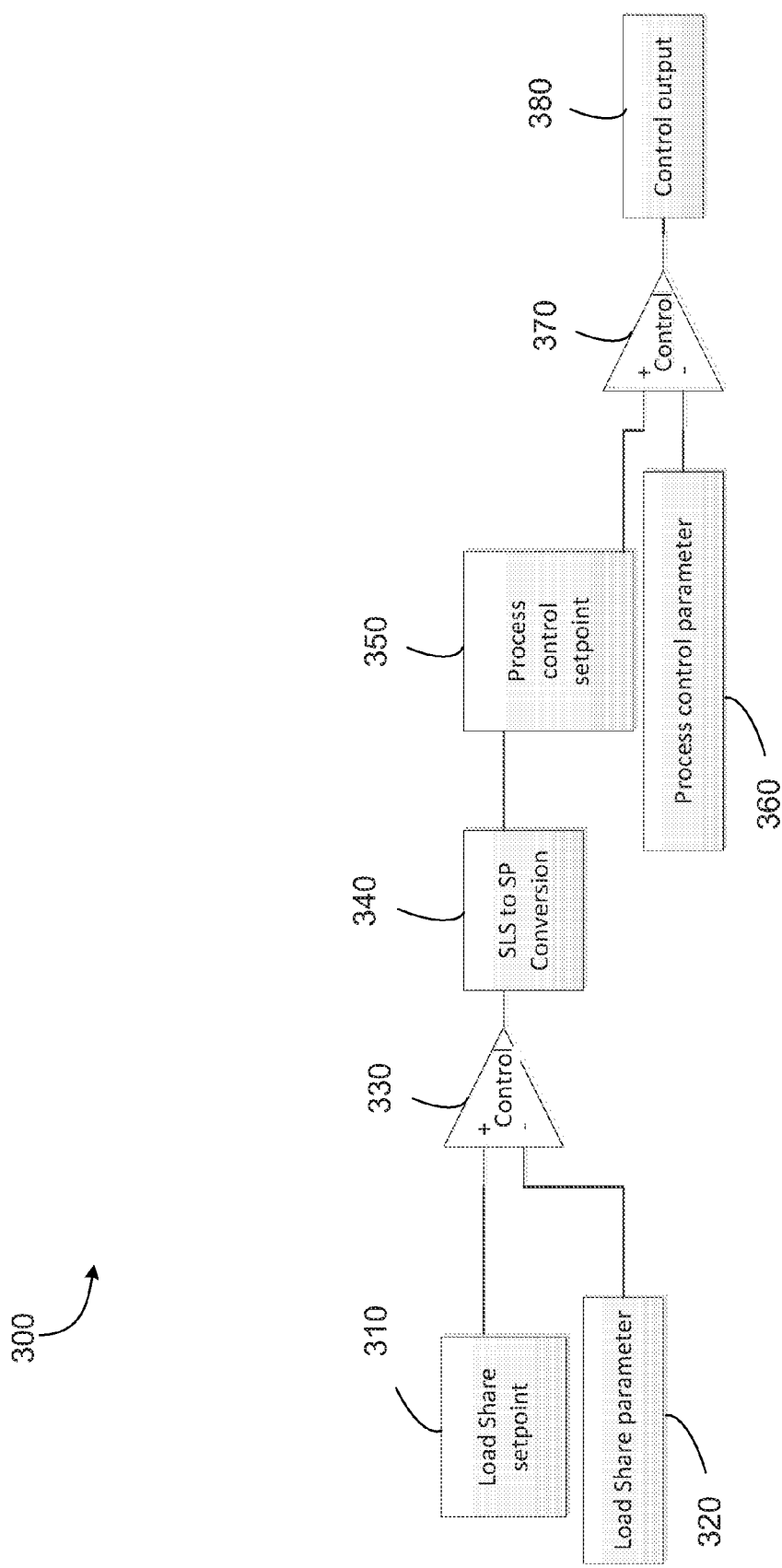
FIG. 3 is a schematic diagram illustrating example functions blocks of a controller that is operable to implement serial load sharing algorithms.

FIG. 3 is a block diagram illustrating example function blocks of a controller 300 that is operable to implement serial load sharing algorithms. Controller 300 can be used as the secondary controller for control valves 118, 158, 216, or 256 in FIGS. 1 and 2, respectively, or in another manner. In some instances, controller 300 can be used in a compressor system that only includes a single compressor train of multiple serial compressors. In the example shown in FIG. 3, compressor 300 includes two controllers 330 and 370, wherein controller 330 is cascaded to controller 370. Controller 330 or 370 can be, for example, a proportional-integral-derivative (PID) controller, or another kind. Controller 330 can be a load sharing controller that operates with load sharing parameters (e.g., distance from surge, pressure ratio, etc.) while controller 370 can be a performance controller that operates with process variables (e.g., pressure, flow rate, etc.).

As an example operation, controller 330 receives load sharing setpoint 310 and load sharing parameter 320 as inputs. Controller 330 dynamically generates serial load sharing (SLS) outputs, for example, based on load sharing setpoint 310 and the load sharing parameters 320. The SLS output, at 340, can be converted to a process performance setpoint (SP) for controller 370. In some implementations, the conversion 340 of the SLS output to performance SP can be implemented as separate control logic from the controller 330 (e.g., as illustrated in FIG. 3), or the conversion 340 can be implemented as an integral component or module of the load sharing controller 330. In some instances, controller 330 together with the conversion logic 340 is referred to as a load sharing controller, which determines process setpoint 350 for performance controller 370. Performance controller 370 receives process setpoint 350 driven by load sharing controller 330 and process control variable 360 and generates control output 380. Control output 380 can be sent to a control mechanism, for example, control valve 118, 158, 216, or 256 in FIGS. 1 and 2, or another mechanism. In response to the control output 380, the control mechanism, for example, can fully or partially open or close to adjust the process variable and eventually realize serial load sharing among multiple serial compressors.

Note that whereas conventional load sharing algorithms typically include averaging, multiplying, or otherwise calculating load sharing parameters, process parameters, or a combination of both to bias the control output, the example techniques described herein use a load sharing controller to drive the process setpoint of the performance controller based on the load sharing parameters. The example techniques described herein can provide, in certain instances, a more complete control over the process and can often obtain more reliable and stable load sharing control.

In some implementations, FIG. 3 can include additional or different function blocks. For example, a manual valve controller may be included to allow manual adjustment or intervention. For example, the outputs of the manual valve controller and performance controller 370 can be compared or otherwise manipulated by additional control logic (e.g., a performance low signal select, a filter, etc.). Then the selected or otherwise manipulated output from the additional control logic can be sent to the control mechanism for load sharing control. Other function blocks can be added and these and other function blocks can be configured in a different manner.

Figure 4:
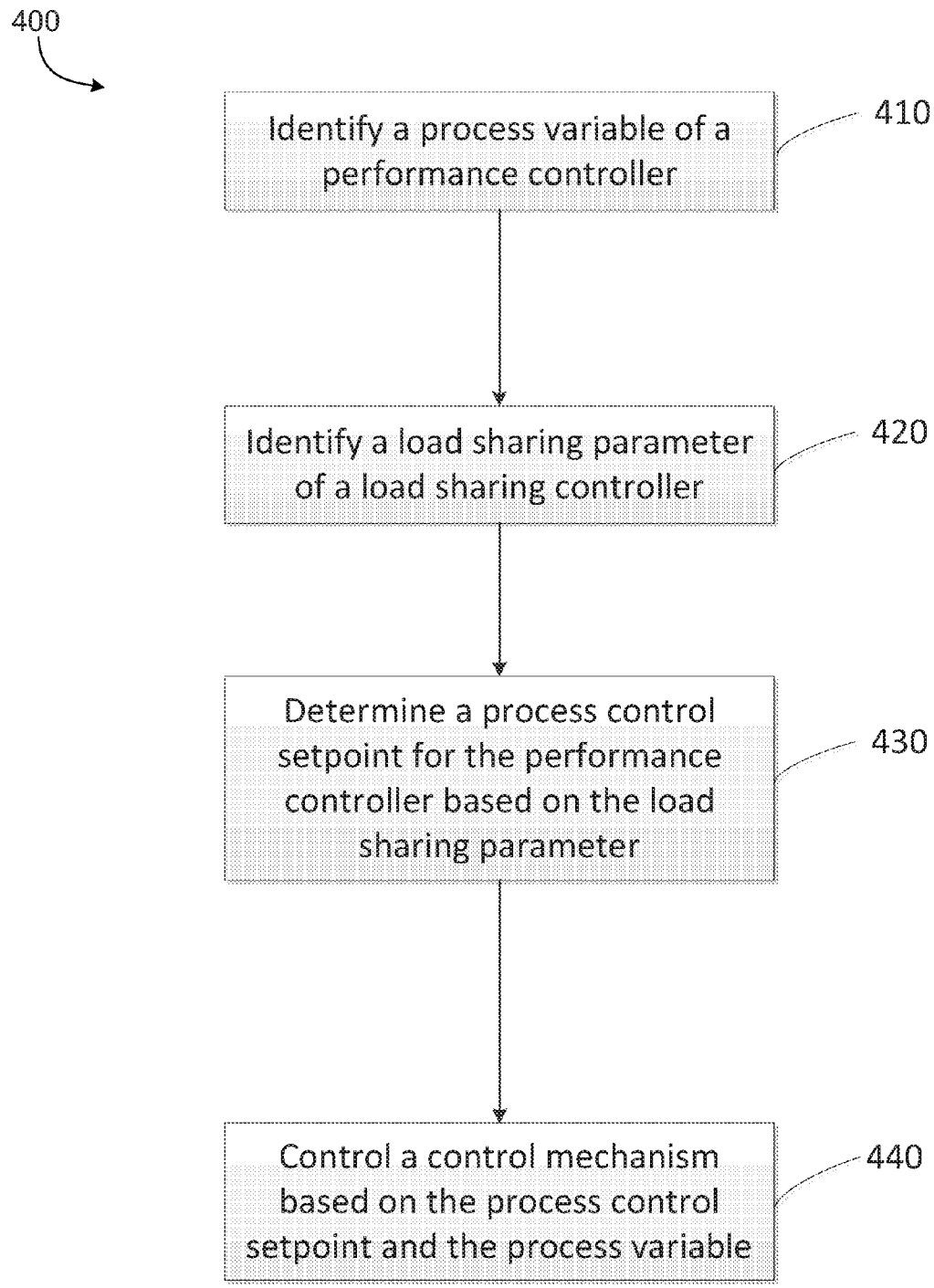
FIG. 4 is a flow chart illustrating an example process for controlling load sharing of compressors connected in series.

FIG. 4 is a flow chart showing an example process 400 for controlling load sharing of compressors in series. All or part of the example process 400 may be implemented in hardware, software, firmware, or a combination thereof. In some instances, the example process 400 can be implemented as an example serial load sharing control algorithm for a compressor system including multiple compressors connected in series. The compressor system can include two or more compressor trains, for example, as shown in FIGS. 1 and 2, or the compressor system can include a single compressor train with multiple serial compressors. As an example, the example process 400 can be implemented as serial load sharing control algorithms for controlling one or more of control valves 118, 158, 216, or 256 shown in FIGS. 1 and 2. In some implementations, the example process 400 may be performed, for example, by any other suitable data processing apparatus, system, software, and hardware, or a combination thereof. The process 400, individual operations of the process 400, or groups of operations may be iterated or performed in parallel, in series, or in another manner. In some cases, the process 400 may include the same, additional, fewer, or different operations performed in the same or different order.

At 410, a process variable (e.g., process control parameter 360) of a performance controller (e.g., performance controller 370) can be identified. In some implementations, pressure associated with a control mechanism (e.g., a control valve) can be identified as the process variable for the performance controller. In this case, the performance controller may be referred to as a pressure controller. In some instances, identifying the process variable can include receiving measurement data or otherwise monitoring the process variable, for example, via measurement equipment (e.g., a pressure transceiver, temperature transceiver, sensor in the field, etc.). In some examples, identifying the process variable can include monitoring the process variables in real time during the operation of the compressor system.

In some applications, a compressor system or a compressor train can include additional control mechanisms. In some implementations, the control mechanism responsible for serial load sharing is a secondary control mechanism while the compressor train further comprises a primary control mechanism. In this case, the performance controller can be configured to control the secondary control mechanism such that the secondary control mechanism and the primary control mechanism operate consistently in response to a change in a process variable or a setpoint of the primary control mechanism. To ensure that the secondary control valve works well with the primary control valve, the process variable of the performance controller can be an intermediate pressure measured between the first control mechanism and the second control mechanism.

For example, as shown in FIG. 1, assuming that controller A is controlling a suction header pressure upstream of the primary control valve 116, the performance of secondary compressor 114 is controlled by controller B via secondary control valve 118. Controller B can implement the example process 400, for example, to balance or otherwise manage the loads of compressors 112 and 114 while working with, not against, the needs of controller A. In this case, controller B can control a pressure upstream of the control valve 118, since controller A is controlling the upstream suction pressure. In the illustrated example, the intermediate pressure between control valves 116 and 118, measured by either PT 113 or 115, can be used as the process variable for the controller B. For example, the discharge PT 115 from compressor 112 can be identified as the process variable of the controller B. Analogously, in FIG. 2, given that the primary control valve 218 controls downstream pressure (e.g., discharge pressure measured by PT 225), the performance controller associated with the secondary control valve 216 can perform the example serial load sharing algorithm 400 and use intermediate pressure (e.g., measured by PT 213 or 215) that is downstream of secondary control valve 216. In some implementations, additional or different downstream pressures can be used as the process variable for the performance controller of the secondary control valve 216.

At 420, a load sharing parameter (e.g., load sharing parameter 320) of a load sharing controller (e.g., load sharing controller 330) can be identified. The load sharing parameter can include, for example, a distance from surge, a pressure ratio, a motor current, a turbine steam consumption, a calculated compressor power (a load value in watts), or other parameters. For instance, any measure of prime mover load can be used as the load sharing parameter. For example, if the prime mover is a motor then motor current could be used, or if the prime mover is a steam turbine, steam flow/consumption could be used. In some implementations, the load sharing parameter can be used to determine a load sharing process variable for the load sharing controller.

As one example, a surge process variable (SPV) can be identified as the load sharing parameter for the load sharing controller. The SPV can be a distance from surge that indicates the distance between the current operating point and the surge line. The surge line can be a collection of surge points on a compressor map. Above the surge line is a region of unstable flow, which is usually avoided. The SPV can be a process variable parameter used by an anti-surge controller to control the anti-surge valve. In some implementations, SPV is a value calculated based on compressor flow, suction pressure, discharge pressure, as well as temperatures. As a specific example, the control line is at SPV=100 and the surge line is at SPV=90. An SPV of greater than 100 is the target operating region, far away from surge with the anti-surge valve closed. Assume two compressors A and B naturally run at some SPV value, for example, SPV(A)=112 and SPV(B)=118. A current load sharing process variable can be identified as SPV(B)/SPV(A)=118/112=1.05, or in another manner.

As another example, pressure ratio can be identified as the load sharing parameter for the load sharing controller. The pressure ratio can be, for example, a ratio of a discharge pressure to a suction pressure of a compressor, or the pressure ratio can be defined in another manner. The load sharing process variable for the load sharing controller can be the ratio of "pressure ratios." For example, if p2A/p1A and p2B/p1B are the pressure ratios for compressor A and B respectively, then (p2B/p1B)/(p2A/p1A), i.e., the pressure ratio of compressor B divided by the pressure ratio of compressor A can be used as the load sharing process variable of the cascaded load sharing controller.

In some instances, the load sharing controller (e.g., load sharing controller 330) can further identify a load sharing setpoint (e.g., load sharing setpoint 310). The load sharing setpoint can be a desirable operating point for serial load sharing control. The load sharing setpoint can be specified or adjusted (e.g., manually or automatically) based on system requirements, process conditions, or other factors. For example, the load sharing setpoint can be a value (e.g., "1") that indicates a balanced load distribution between two or more compressors. In other instances, the load sharing setpoint can be another value. For example, the load sharing setpoint can be specified (e.g., by an operator) to be a certain value so that the compressors operate at a particular imbalance of pressure ratios or SPV's, etc. (e.g., in the case that the multiple compressors in the train are dissimilar). The load sharing controller can compare the load sharing setpoint and load sharing process variable to dynamically determine a control output that can cause the load sharing process variable to approach or achieve the load sharing setpoint. Specifically, in the above SPV example, if the load sharing setpoint of the load sharing controller is set to be 1.05, then the load sharing controller would be satisfied running at SPV(A)=112 and SPV(B)=118 for the compressors A and B. On the other hand, if the setpoint for the cascaded serial load sharing controller is 1, then the cascaded load sharing controller will decrease its output to try to achieve, for example, a target SPV(B)/SPV(A)=115/115=1, or in another manner.

At 430, a process control setpoint (e.g., process control setpoint 350) for the process variable of the performance controller can be determined dynamically based on the load sharing parameter by the load sharing controller (e.g., load sharing controller 330 and the SLS to SP conversion 340). For example, the process control setpoint can be converted from a load sharing output that is determined based on the load sharing parameter and the load sharing setpoint of the load sharing controller. In some implementations, the load sharing process variable, the load sharing setpoint, or both, can vary during the operation of the compressor system. The load sharing output, and thus the process control setpoint, can be determined dynamically in response to a change of the load sharing process variable, the load sharing setpoint, or both. As a result, the cascaded load sharing controller is dynamically driving the setpoint for the performance controller during operation of the compressors. In some instances, an exact setpoint for the process variable (e.g., pressure) is not readily available; hence, a range of process control setpoints can be driven by the cascaded load sharing controller. These ranges can be configured and tuned as needed for best performance, for example, based on a rated condition given in compressor data sheets. The output of the cascaded controller is converted into a pressure setpoint range, which allows the performance controller to adjust the process variable while maintaining a desirable load sharing process variable.

As an example technique, the cascaded load sharing controller calculates an output signal of 0-100%. This percentage can be converted into a setpoint for the performance controller that operates on, for example, pressure. In one example implementation, the conversion is done by linearly scaling 0 to 100% of the load sharing controller output to some minimum and maximum pressure values. For example, for Compressor A's discharge pressure, the rated pressure may be around 700 PSI. Based on this rated pressure, for testing, values of 500 and 900 PSI may be chosen as the minimum and maximum pressures for the pressure setpoint conversion. In this example, 0-100% corresponds to 500-900 PSI where 0%=500 PSI and 100%=900 PSI. The pressure range 500-900 PSI is then the moving setpoint for the performance controller based on the load sharing parameter from the cascaded load sharing controller. In the above example, the chosen range is just outside of the specification from the anti-surge pressure tables provided for Compressor A, which show surge occurs at approximately 550 PSI and choke occurs at approximately 800 PSI. The surge and choke limits from the anti-surge pressure tables could also be chosen as the serial load sharing pressure range limits, and the effects on the process and load sharing performance can be observed. Additional or different values can be specified as the minimum and maximum pressures. For example, if desirable, the minimum and maximum values for serial load sharing could also be set to be smaller or larger than the range specified in the compressor pressure tables. In some instances, a wider range would allow the cascaded load sharing controller to drive the performance controller faster and farther to achieve the load sharing goals. A smaller range would result in more stable pressure control in the train, and possibly less process upset.

At 440, a control mechanism can be controlled based on the process control setpoint and the process variable. The control mechanism can include one or more of a control valve, a speed controller, an inlet guide vane, or another control means. The control mechanism can receive a control signal from the performance controller and respond (e.g., partially or fully open or close) according to the control signal. The performance controller can compare its process control setpoint (e.g., determined based on the load sharing parameter at 430) and process variable and determine the output to control the control mechanism based on the comparison. For instance, using the same SPV example described above, given that a load sharing a setpoint is 1 and a current load sharing process value is 1.05, the load sharing controller will decrease its output. The decrease of the load sharing controller output will result in a decrease of the process control setpoint (e.g., a pressure setpoint) of the performance controller. In this case, the load sharing controller can be referred to as a non-inverted controller. Upon decrease of the pressure setpoint, assuming that the performance controller process value is higher than the pressure setpoint, the performance controller will increase its output since the performance controller is an upstream pressure controller (e.g., performance controller for control valve 118 or 158 in FIG. 1). The valve can open to decrease the upstream pressure. In this suction pressure control case, the performance controller is an inverted controller. On the other hand, for discharge pressure control (e.g., as shown in FIG. 2), to increase the process variable, the valve (e.g., control valve 216 or 256) would open instead of close and the performance controller would not be inverted. For arrangements of valves and pressure transmitters that are configured differently (e.g., from FIGS. 1 and 2), the inversion of performance controller and load sharing controller may be different.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages.

A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

A number of examples have been shown and described; various modifications can be made. While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented separately or in any suitable sub-combination. Accordingly, other implementations are within the scope of the following claims.

The invention claimed is:

1. A compressor system comprising:
    a compressor train including two or more compressors connected in series;
    a primary control mechanism being controlled by a primary performance controller; and
    a secondary control mechanism being controlled by a secondary performance controller, the secondary performance controller being operable to:
        identify a process variable of the secondary performance controller, wherein the process variable of the secondary performance controller comprises a pressure between the primary control mechanism and the secondary control mechanism;
        receive, on a recurrent basis from a load sharing controller, a setpoint for the process variable of the secondary performance controller, wherein the setpoint is determined dynamically during operation of the two or more compressors by the load sharing controller based on a load sharing parameter associated with the two or more compressors; and
        control the secondary control mechanism based on the setpoint and the process variable of the secondary performance controller to operate consistently with the primary control mechanism in response to a change in a process variable or a setpoint of the primary control mechanism.

2. The compressor system of claim 1, wherein the secondary control mechanism comprises one or more of a control valve, a speed governor, or an inlet guide vane.

3. The compressor system of claim 1, wherein the compressor train further comprises a pressure transducer, and the secondary performance controller is operable to identify pressure measured by the pressure transducer as the process variable of the secondary performance controller.

4. The compressor system of claim 1, wherein the load sharing parameter is one of a distance from surge, a pressure ratio, a motor current, or a turbine steam consumption.

5. The compressor system of claim 1, wherein the secondary performance controller is configured to control the secondary control mechanism to move in the same direction as the primary control mechanism when responding to the change in the process variable or the setpoint of the primary control mechanism.

6. The compressor system of claim 1, wherein the compressor train is a first compressor train, further comprising one or more additional compressor trains, the one or more additional compressor trains and the first compressor train being connected in parallel, wherein the primary control mechanism of the first compressor train is subject to parallel load sharing among the first compressor train and the one or more additional compressor trains.

7. The compressor system of claim 1, wherein the primary control mechanism comprises one or more of a control valve, a speed governor, or an inlet guide vane.

8. The compressor system of claim 1, wherein the load sharing parameter is a distance from surge, and the setpoint is determined dynamically during operation of the two or more compressors by the load sharing controller based on the load sharing parameter associated with the two or more compressors to maintain the two or more compressors at an equal distance from surge.

9. The compressor system of claim 1, wherein the load sharing parameter is a ratio of pressure ratios of the two or more compressors, and the setpoint is determined dynamically during operation of the two or more compressors by the load sharing controller based on the load sharing parameter associated with the two or more compressors to achieve a target ratio of the pressure ratios of the two or more compressors.

10. The compressor system of claim 9, wherein the target ratio of the pressure ratios of the two or more compressors represents a balanced load distribution between two or more compressors.

11. A controller operable to control a secondary control mechanism of a control system, the control system further comprising a primary control mechanism controlled by a primary performance controller and a compressor train including two or more compressors connected in series, the controller operable to:
identify a process variable of the controller, wherein the process variable of the controller comprises a pressure between the primary control mechanism and the secondary control mechanism;
receive, on a recurrent basis from a load sharing controller, a setpoint for the process variable of the controller, wherein the setpoint is determined dynamically during operation of the two or more compressors by the load sharing controller based on a load sharing parameter associated with the two or more compressors; and
control the secondary control mechanism based on the setpoint and the process variable of the controller to operate consistently with the primary control mechanism in response to a change in a process variable or a setpoint of the primary control mechanism.

12. The controller of claim 11, wherein the secondary control mechanism comprises one or more of a control valve, a speed governor, or an inlet guide vane.

13. The controller of claim 11, wherein the primary control mechanism comprises one or more of a control valve, a speed governor, or an inlet guide vane.

14. The controller of claim 11, wherein the compressor train further comprises a pressure transducer, and the secondary performance controller is operable to identify pressure measured by the pressure transducer as the process variable of the secondary performance controller.

15. The controller of claim 11, wherein the load sharing parameter is one of a distance from surge, a pressure ratio, a motor current, or a turbine steam consumption.

16. The controller of claim 11, wherein the compressor train is a first compressor train, further comprising one or more additional compressor trains, the one or more additional compressor trains and the first compressor train being connected in parallel, wherein the primary control mechanism of the first compressor train is subject to parallel load sharing among the first compressor train and the one or more additional compressor trains.

17. The controller of claim 11, wherein the controller is configured to control the secondary control mechanism to move in the same direction as the primary control mechanism when responding to the change in the process variable or the setpoint of the primary control mechanism.

18. The controller of claim 11, wherein the load sharing parameter is a distance from surge, and the setpoint is determined dynamically during operation of the two or more compressors by the load sharing controller based on the load sharing parameter associated with the two or more compressors to maintain the two or more compressors at an equal distance from surge.

19. The controller of claim 11, wherein the load sharing parameter is a ratio of pressure ratios of the two or more compressors, and the setpoint is determined dynamically during operation of the two or more compressors by the load sharing controller based on the load sharing parameter associated with the two or more compressors to achieve a target ratio of the pressure ratios of the two or more compressors.

20. The controller of claim 19, wherein the target ratio of the pressure ratios of the two or more compressors represents a balanced load distribution between two or more compressors.

* * * * *